Aug. 5, 1969  H. W. NAGEL  3,459,638
DISTILLATION DESALINATION OF SEA WATER USING HEATED METAL
BALLS TO VAPORIZE WATER
Filed Jan. 24, 1967
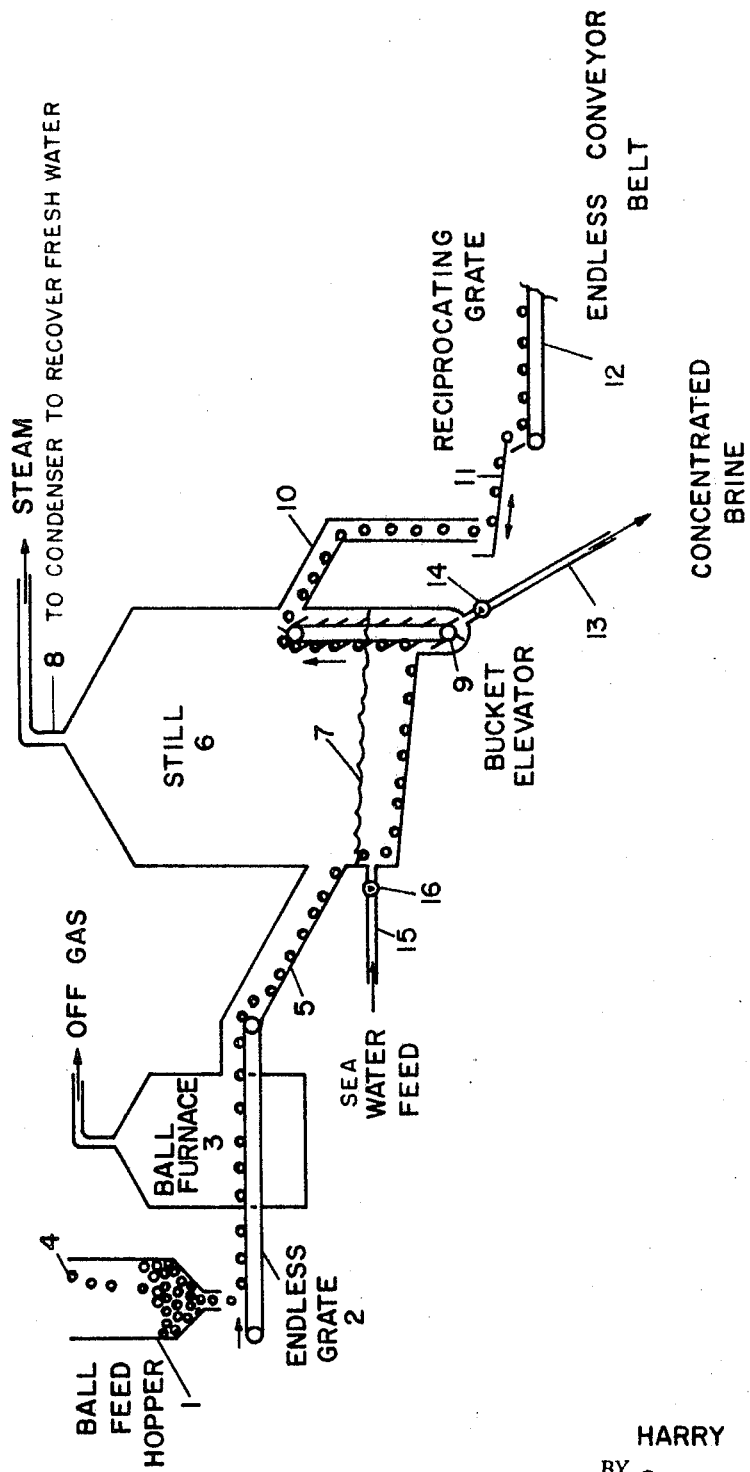
INVENTOR.
HARRY W. NAGEL
BY Donald R. Johnson
ATTORNEY

United States Patent Office 3,459,638
Patented Aug. 5, 1969

3,459,638
DISTILLATION DESALINATION OF SEA WATER USING HEATED METAL BALLS TO VAPORIZE WATER
Harry W. Nagel, West Chester, Pa., assignor to Sun Oil Company, Philadelphia, Pa., a corporation of New Jersey
Filed Jan. 24, 1967, Ser. No. 611,465
Int. Cl. C02b 1/06; C23f 15/00; B01d 3/32
U.S. Cl. 203—7                                    9 Claims

ABSTRACT OF THE DISCLOSURE

Sea water is distilled in a still by using as the heat transfer medium in the still a moving bed of refractory metal balls. The metal balls are heated then passed into the sea water then removed from the still thus heating the water. Any scale is formed on the metal balls not the surfaces of the still. The scale is removed from the metal balls mechanically and the balls reheated and passed into the solution again.

BACKGROUND OF THE INVENTION

A number of methods for desalination have been devised. These range from simple distillation to electric shock treatments.

In a widely-used method called the multi-stage flash method, hot brine is passed through a series of compartments, each successive compartment having progressively lower pressure so that as the hot brine passes from compartment to compartment, it flashes into steam and is cooled on condensers.

Another method employs a spray of molten metal passed into a pool of salt water causing the water to flash, distilling off pure water.

In another method, salt water is subjected to freezing temperatures. The resulting ice crystals are pure water. The crystals are separated from the brine and allowed to melt.

In another method of treating salt water known as reverse osmosis, the water is made to pass through cellulose acetate membranes under pressure. The salt does not pass through the membranes and pure water is collected.

In still a further method, an electric current is passed through salt water causing the sodium and chloride in the salt to separate thus leaving pure water to be drawn off.

Although as indicated above, there are various modes of separating the dissolved salt from sea water, the most promising from both ease of operation and economy is generally considered to be some kind of distillation.

One problem that faces distillation methods is the formation of scale which is produced principally from the minerals dissolved in the sea water. The scaling generally occurs on the heat transfer surface and as a result reduces the effectiveness of the heat transfer. The usual method for overcoming scaling is to shut down a distilling operation and physically or chemically remove the scale.

SUMMARY OF THE INVENTION

The present invention relates to a process for the desalination of sea water. More particularly, the invention relates to a process wherein hot balls of metal are passed through the sea water thereby heating the water to form steam. The metal balls are recovered, the scale which is formed thereon removed and the balls reheated and recycled to the brine solution.

The drawing is a diagrammatic representation of one embodiment of the invention showing the relationship of the cooperating elements of a distillation apparatus and the performance of the process therein.

DESCRIPTION OF THE INVENTION

The present invention overcomes the problem of scaling on the heat transfer surface by employing as the heat transfer surface balls of metal. The metal balls are heated generally to a temperature in the range of 500° F. to 2,000° F. and passed into the sea water or brine solution whereupon they heat the water to above its boiling point causing pure potable desalinated water to distill off. The scale forming material in the brine is then deposited onto the heat transfer surface, i.e., the metal balls. The metal balls are subsequently removed from the brine solution and the scale removed. The balls now are reheated as described above and again passed into the brine solution. This process can be repeated indefinitely since the scale is formed on the metal balls and subsequently removed outside of the still thus reducing scale formation in the still itself so that the instant process may be carried on many times longer than any conventional distillation between shut downs for scale removal. The metal balls can be made from stainless steel, titanium, tantalum, or any other refractory corrosion resistant metal.

These and other aspects of the invention will be more fully understood from the following detailed description taken in conjunction with the accompaning drawing which is a diagrammatic scheme illustrating one embodiment of the invention.

Referring to the drawing:

The metal balls 4 pass from ball feed hopper 1 onto endless grate 2 which carries them into ball furnace 3. They are heated to a temperature in the range of 500° F. to 2,000° F., preferably 1,000° F. to 1,500° F. From ball furnace 3 the hot metal balls pass through conduit 5 into still 6 where they drop into brine solution 7 heating the brine solution to above its boiling point. The metal balls are cooled by contact with the brine solution and passed along the slanted bottom of still 6 to bucket elevator 9 where they are carried out of the brine solution and deposited in conduit 10. The cooled metal balls pass through conduit 10 onto reciprocating metal grate 11 where the scale is knocked loose from the balls by the action of the grate and the collision of the balls with each other. The scale removed from the balls passes through the grate and is conveniently removed. The balls then pass off of the grate 11 onto the endless conveyor belt 12 and are recycled to ball feed hopper 1. The ball furnace 3 can be supplied energy by any suitable means such as gas, oil, coal or atomic fuel. Any off gases may be vented to the atmosphere or may be used to preheat the water feed which is fed to the still through conduit 15 and valve 16. The supply of water may be regulated automatically in order to maintain a constant water level in the still 6. The concentrated brine solution resulting from the distillation is removed through valve 14 and conduit 13 and may be recycled with the water feed or discharged. The discharged brine solution can be employed as an economically recoverable source of chemicals such as potash, magnesium, bromine, salt, silver and the like because the prevention of the scale formation in the still according to the invention allows the brine solution to be evaporated to very high concentration, whereas in the conventional stills presently in use the scaling problem is accelerated as the brine becomes more concentrated. Steam from still 6 passes through conduit 8 to condensers and storage tanks not shown. Alternatively the steam may be used to preheat the water feed. In order to assure that the steam proceeds through conduit 8 rather than any other of the conduits in the still, it is desirable that a slight vacuum be pulled on the system. The recoverable water is desalinated potable water suitable for consumption or other uses.

As an alternative to the generation of hot gases in the ball furnace 3, they may be generated outside of the ball furnace 3, for example in a dutch oven, turbo compressor, or jet engines such as those used in airplanes which would serve as both compressor and heater.

The rate at which the metal balls 4 are fed from hot ball hopper 1 is maintained to be approximately the same rate at which the metal balls 4 are removed from still 6 by bucket elevator 9. This can be done automatically for example with photo sensing devices or mechanically by actual observation. The size of the metal balls 4 is not particularly critical; however, it is preferred that the diameter of the metal balls be in the range of 0.5 inch to 1.5 inches. This is principally for ease of handling and availability. For practical operation, the diameters of the balls should be substantially uniform. The water level 7 in still 6 should be maintained at approximately 10 to 100 times the average diameter of the balls.

It is understood that the procedure as described above merely represents one embodiment and that it is within the skill of those in the art to apply the novel process set forth herein to apparatus of other and different design.

In order to obtain optimum equipment life, it is preferable that the metal parts that would otherwise be exposed during the process be of a corrosion resistant nature such as those described for the balls.

The principal advantages of the instant invention over prior processes for the production of potable water are that the equipment has far less down time for equivalent amounts of water produced than comparable equipment employing more conventional processes and the availability of a concentrated brine solution for recovery of chemical components.

The invention claimed is:

1. The method of desalination comprising
    (a) heating metal balls to a temperature in the range of 1,000 to 1,500° F.
    (b) passing the hot solid metal balls into a solution of salt in water at atmospheric pressure,
    (c) vaporizing the water at atmospheric pressure without further heat and condensing the vapor to distillate and
    (d) removing the cooled metal balls from the solution of salt in water.

2. The method according to claim 1 wherein desalinated water is recovered.

3. The process according to claim 2 wherein deposits on the metal balls are removed and the metal ball recycled into step $a$.

4. The method according to claim 3 wherein the metal balls are corrosion resistant.

5. The method according to claim 4 wherein a concentrated salt solution is removed from the distillation zone and a fresh feed of less concentrated solution of salt in water is added to the distillation zone.

6. The method of desalination according to claim 1 wherein a highly concentrated solution of salt in water is recovered.

7. The method according to claim 1 wherein the metal balls have a diameter in the range of 0.5 inch to 1.5 inches.

8. The method according to claim 7 wherein the diameters of the metal balls is substantially uniform.

9. The method according to claim 8 wherein the depth of the water is in approximately 10 to 100 times the diameter of the average diameter of the metal balls.

References Cited

UNITED STATES PATENTS

| | | | |
|---|---|---|---|
| 2,601,102 | 6/1952 | Dickey. | |
| 2,796,237 | 6/1957 | Nettel. | |
| 2,905,596 | 9/1959 | Findlay | 203—72 |
| 3,242,975 | 3/1966 | Kogan | 203—7 X |
| 3,272,335 | 9/1966 | Nettel | 165—106 X |
| 3,305,455 | 2/1967 | Loebel | 203—7 |
| 3,335,083 | 8/1967 | Tibball | 202—235 X |

FOREIGN PATENTS

| | | |
|---|---|---|
| 701,544 | 12/1953 | Great Britain. |
| 608,014 | 7/1926 | France. |
| 664,792 | 1/1952 | Great Britain. |

NORMAN YUDKOFF, Primary Examiner

F. E. DRUMMOND Assistant Examiner

U.S. Cl. X.R.

203—10, 100; 210—56